July 5, 1949.    F. M. CLARK    2,475,310
HIGH-FREQUENCY ELECTRIC CAPACITOR
Filed Sept. 1, 1944
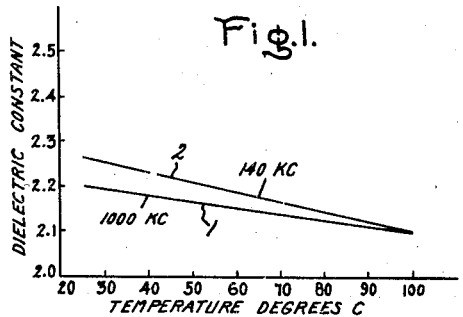
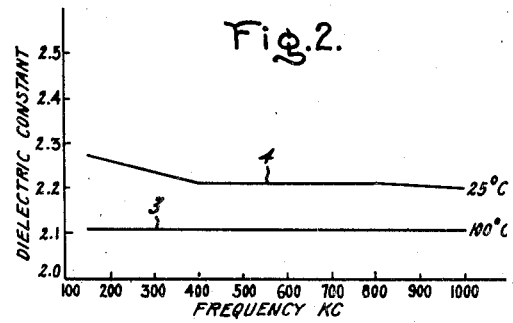
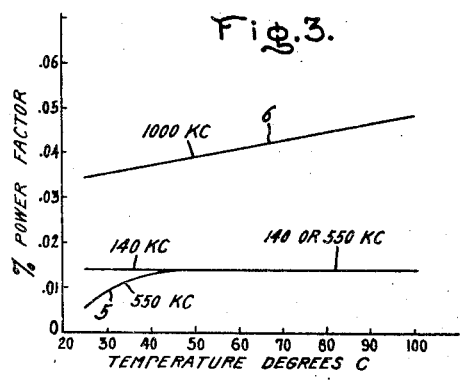
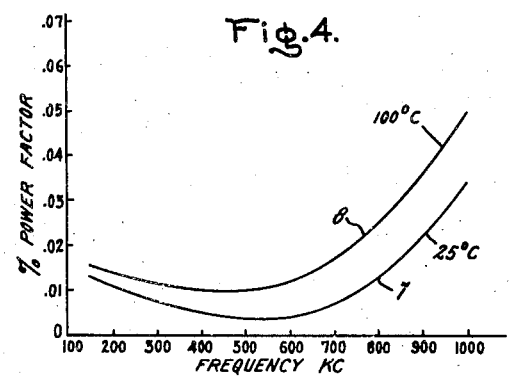
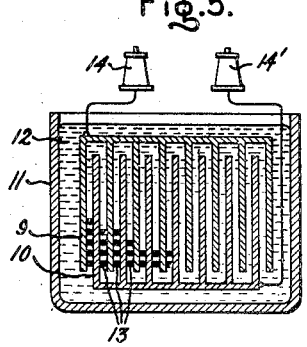
Inventor:
Frank M. Clark,
by Harry E. Dunham
His Attorney.

Patented July 5, 1949

2,475,310

UNITED STATES PATENT OFFICE 2,475,310

HIGH-FREQUENCY ELECTRIC CAPACITOR

Frank M. Clark, Pittsfield, Mass., assignor to General Electric Company, a corporation of New York Application September 1, 1944, Serial No. 552,225

2 Claims. (Cl. 175—41)

1

The present application is a continuation-in-part of my prior application, Serial No. 493,857, filed July 8, 1943, and relates to electrical capacitors which are particularly adapted for efficient operation in the high frequency field.

One of the objects of my invention is to provide capacitors adapted for operation in power oscillator circuits for industrial heating at frequencies up to 1000 kilocycles. The frequencies commonly in commercial use are in the range of about 500 to 1000 kilocycles.

Another object of my invention is to provide capacitors adapted for operation at high frequencies over a range of temperatures of about 25 to 100° C. with little or no change in capacity. Substantial constancy of capacity in high frequency circuits over such range of operating temperatures is particularly desirable in radio transmitter apparatus.

The properties of liquid dielectric materials when subjected to high frequencies, that is, frequencies well above about 10 kc., are quite unlike the properties of liquid dielectrics at ordinary low frequencies. In commercial alternating current circuits the conventional frequencies are of the order of 25 to 60 cycles. Commonly, liquid dielectric materials which have been found in low frequency circuits to possess suitably high dielectric constant and which have operated with tolerably low dielectric losses have been found to operate in high frequency circuits with a low dielectric constant or with high energy loss.

As stated in my prior application Ser. No. 493,857 of which the present application is a continuation-in-part, for the most advantageous utilization of a dielectric in the high frequency field its viscosity should not materially exceed 100 seconds Saybolt at 37.8° C. Such low viscosity materials operate efficiently with low power factors in the high frequency field.

I have discovered that liquid aliphatic organic esters of the borate type and mixtures of such esters surprisingly are well suited for dielectric function in high frequency capacitors. My present invention comprises capacitors containing such borate esters as dielectric materials.

The physical properties of the liquid aliphatic borate esters will be described in greater detail in connection with the accompanying drawings in which Fig. 1 is a graph showing the relation of dielectric constant to change of temperature from about 25 to 100° C. of butyl borate dielectric material; Fig. 2 is a graph showing the relation of dielectric constant of butyl borate to variation of frequency from about 100 to 1000 kc.; Fig. 3

2 is a graph showing the relation of power factors over a range of temperature from 25 to 100° C. of butyl borate at two different frequencies; Fig. 4 is a graph showing the relation of power factor (per cent) to frequency of butyl borate at two different temperatures; and Fig. 5 illustrates conventionally and in section a capacitor containing a dielectric material embodying my invention.

Castor oil, as a representative liquid ester dielectric which heretofore has been used in capacitors, has a power factor of about 0.2 per cent at frequencies of the order of about 60 cycles. The power factor decreases to about .05 per cent as the frequency rises to about 1000 cycles (1 kc.). The power factor rises with further increase of frequency until it reaches the relatively high value of about 2 to 5 per cent at frequencies of about 100 to 1000 kc.

The borate type of aliphatic esters has a relatively high energy loss at commercial frequency of about 60 cycles, values as high as 20 to 30 per cent being observed. As the frequency increases, the energy loss in the liquid organic aliphatic borates decreases until at frequencies above 10 kc. the power factor is below one per cent. At the commonly used industrial heating frequency of 550 kc., the power factor of butyl borate over a temperature range from 25 to 100° C. assumes the very low value of 0.005 to 0.015 per cent. The low energy loss characteristic of butyl borate, when subjected to a high frequency electric field, adapts such material well for use as a high frequency capacitor dielectric.

Butyl borate is characterized by a high dielectric strength of about 30 to 40 kilovolts at a temperature of 25° C. when employing the usual 0.1 inch test gap and standard ASTM procedure.

As indicated by Fig. 1, the dielectric constant of butyl borate at a temperature of about 25° C. is about 2.2 in an electric field of about 1000 kc. frequency. With a temperature rise to 100° C., the dielectric constant is decreased to about 2.1. This is illustrated by graph 1, the change being about .06 per cent per degree centigrade. A slightly higher rate of change with rise of temperature is noted at a frequency of 140 kc., as shown by curve 2.

As visually indicated by curve 3 of Fig. 2, the dielectric constant of the butyl borate at 100° C. is substantially invariable at frequencies over the range of about 140 to 1000 kc. As shown by curve 4, this material at 25° C. exhibits a slight lowering of dielectric constant as the frequency rises from about 140 to 400 kc.; and exhibits a very slight additional drop when the frequencies increase from 400 to 1000 kc.

As shown in Fig. 3, curve 5, the power factor of butyl borate in a high frequency field of about 550 kc. is only about 0.01 at a temperature of 25° C. In the range of about 25 to 50° C., the power factor progressively rises from about 0.005 to about 0.015 per cent. With further change of temperature from 50 to 100° C., the power factor is substantially constant. At a frequency of 140 kc., the initial slight rise of power factor above-noted is absent. In an electric field of 1000 kc., the power factor at a temperature of about 25° C. is about 0.035. As shown by curve 6, a slow, gradual rise of power factor to a value of .045 per cent occurs when the temperature rises to 100° C. Liquids with this low power factor at 100° C. are considered entirely suitable for high frequency capacitor use.

As shown in Fig. 4, butyl borate exhibits a minimum energy loss at impressed frequencies of about 500 to 600 kc., the frequency range most commonly used in power oscillators. Curve 7 shows the relative per cent power factor values at 25° C. over a range of 140 to 1000 kc. Curve 8 shows the same relation for a temperature of 100° C. It should be noted that even the highest value of per cent power factor of butyl borate at 100° C. is still below 0.05 per cent, which is a low value from an economic and practical operating standpoint.

Butyl borate has the following other physical properties:

Viscosity _____ 32 sec. Saybolt Univ. at 37.8° C. (1000° F.)
Specific gravity _____ .839 (25°/15.5° C.)
Pour point _____ —66° C.
Refractive index _____ 1.4000 at 25° C.

Various other borates are, in most respects, similar to butyl borate. For example, octyl borate has a dielectric constant at 1000 kc. which is substantially constant over the range of 25 to 100° C., the change per degree centigrade being only .06 per cent. The power factor of octyl borate at 1000 kc. decreases from .035 per cent at 25° C. to .019 per cent at 100° C. This material is also characterized by the following other physical properties:

Viscosity _____ 50 sec. Saybolt Univ. at 37.8° C.
Specific gravity _____ .863 (25°/15.5° C.)
Pour point _____ Below —60° C.
Refractive index _____ 1.4350 at 25° C.

Benzyl borate is a colorless liquid which in many respects is similar to the borates described heretofore. For a viscosity of 50 seconds Saybolt Universal at 37.8° C., it is characterized by a dielectric constant at 25° C. of 2.9, and at 65° C. of 2.8, and at 100° C. of 2.7, this being a change of 0.09 per cent per degree centigrade. The power factor at this same frequency falls from .05 per cent at 25° C. to .03 per cent at 100° C. By the term "aliphatic organic esters," I wish to include the borate esters derived from the aliphatic alcohols, including benzyl alcohol, which herein is considered as the phenyl derivative of methyl alcohol ($C_6H_5CH_2OH$).

The liquid high frequency dielectric materials of the borate ester type may be employed in conventional capacitors heretofore used for the high frequency field. As conventionally indicated in Fig. 5, such capacitors may comprise spaced armatures 9, 10 contained in a tank 11. The space between the armatures, as indicated in Fig. 5, may be wholly filled with a liquid borate ester dielectric material 12 or, in some cases, suitable spacers, as conventionally indicated at 13, consisting of inert material of high porosity may partly fill the space between the armatures. Such spacer may assume various forms, as for example glass wool, cheesecloth, highly porous paper, or mineral particles containing numerous spaces may be present to partially fill the space between the armatures. While in some cases it is convenient to employ spacers between the armatures, such spacers are not essential and may be omitted. The illustration of the armatures 9, 10 which are shown connected to external terminals 14, 14' is diagrammatic.

The examples of aliphatic ester borates herein described are illustrative. My invention includes generally capacitors containing an aliphatic ester of boric acid or mixtures of such esters.

What I claim as new and desire to secure by Letters Patent of the United States is:

1. An electric capacitor for use at frequencies of from 100 to 1000 kilocycles comprising cooperating armatures and a liquid butyl borate dielectric material therebetween.

2. An electric capacitor for use at frequencies of from 100 to 1000 kilcycles comprising cooperating armatures and a liquid dielectric material therebetween having a viscosity not exceeding about 50 seconds Saybolt Universal at 37.8° C. which is chosen from the class consisting of butyl borate, octyl borate, benzyl borate and includes mixtures of such borates.

FRANK M. CLARK.

REFERENCES CITED

The following references are of record in the file of this patent:

UNITED STATES PATENTS

| Number | Name | Date |
|---|---|---|
| 1,895,376 | Clark | Jan. 24, 1933 |
| 1,966,163 | Clark | July 10, 1934 |
| 2,013,564 | Lilienfeld | Sept. 3, 1935 |
| 2,340,644 | Clark | Feb. 1, 1944 |